United States Patent [19]

Davidson

[11] Patent Number: 5,345,600
[45] Date of Patent: Sep. 6, 1994

[54] METHOD AND APPARATUS FOR SELECTIVELY-ENABLED DIVERSITY SIGNALING IN A RADIO COMMUNICATIONS SYSTEM

[75] Inventor: Allen L. Davidson, Crystal Lake, Ill.

[73] Assignee: Motorola, Inc., Schaumburg, Ill.

[21] Appl. No.: 114,526

[22] Filed: Aug. 31, 1993

[51] Int. Cl.⁵ .............................................. H04B 1/10
[52] U.S. Cl. .................................. 455/50.1; 455/54.1; 370/95.3; 375/38
[58] Field of Search ........................ 455/8, 9, 10, 52.3, 455/65, 101, 54.1, 50.1; 370/95.1, 95.3, 69.1; 375/38

[56] References Cited

U.S. PATENT DOCUMENTS 5,010,583  4/1991  Parker ..................................... 455/9
5,129,096  7/1992  Burns ...................................... 455/9

Primary Examiner—Reinhard J. Eisenzopf
Assistant Examiner—Mary M. Lin
Attorney, Agent, or Firm—James A. Coffing; Steven G. Parmelee

[57] ABSTRACT

In a radio communications system, a selectively enabled time- and/or frequency-diverse signaling scheme is employed to improve signal quality. In particular, a method of exchanging a message between communication devices using a communications resource might include the step of transmitting a first portion of the message on a first frequency within the communications resource. After determining the quality of the communications resource to be unfavorable, a second portion of the message might be transmitted on the first frequency, and also re-transmitted on a second frequency and/or at a separate time.

17 Claims, 3 Drawing Sheets

METHOD AND APPARATUS FOR SELECTIVELY-ENABLED DIVERSITY SIGNALING IN A RADIO COMMUNICATIONS SYSTEM

FIELD OF THE INVENTION

The present invention relates generally to radio communications systems, and particularly to a method and apparatus for improving the perceived quality of signals transmitted over a communications resource while making efficient use of the communications resource.

BACKGROUND OF THE INVENTION

A well known radio communications system is a trunked radio system, such as that used in land mobile service. Such a system typically includes several transmitters and receivers, or so-called transceivers, implemented as repeaters that are located throughout a geographical coverage area of the system. Thus, communication among radios—e.g., mobiles, portables—throughout the coverage area is facilitated through use of the repeaters located throughout the coverage area.

In today's radio communications systems, signals that are exchanged between two communication devices—e.g., a repeater and a radio—transmitted over an intervening air space, typically suffer from a degradation in quality before being received. Over some design range, the system might function within acceptable parameters, such that the degradation falls within a pre-established design limit. However, when this design range is exceeded, the quality of the transmitted signal falls below the acceptable quality level, and satisfactory communication can not be successfully maintained.

The aforementioned unfavorable condition—i.e., unacceptable signal quality—may be the result of the spatial distance between the transmitter and receiver—i.e., the actual distance being greater than some preestablished design range. Alternatively, the poor quality might come about due to obstructions—e.g., buildings, hills—in the signal path between the transmitter and receiver. Further, the degradation may be the result of a change in the direction of propagation of the signal—e.g., reflection and/or diffraction upon and around buildings.

Regardless of the source of this unfavorable condition—i.e., poor signal quality—it is possible to improve the quality of the signal by various known means. Generally, diversity techniques—e.g., frequency-, time-, and space-diversity employed in the communications resource—are used to improve the communications quality of the signal. However, these techniques have both theoretical and practical limitations, as later described.

One method used to improve the quality of the signal beyond the range given is to increase the signal power—i.e., signal energy—of the transmitted signal. Likewise, a decrease in the noise power—i.e., noise energy—detected by the receiver will serve to improve the resulting quality of the signal. However, transmission power is limited by the technology available to manufacture power amplifiers, and by the current drain that is permissible from the power supplies. Also, high power amplifiers require a relatively large size because of the required size of the heat sink used to dissipate the heat.

In addition, the federal communications commission (FCC) places strict limits on the power radiated, since high power levels will cause problems in frequency re-use schemes—i.e., the same frequency resource is utilized in nearby geographical regions. At base sites, the industry is close to the limits of RF power imposed by the FCC, and is at the limits of the technology. In the remote transceivers, the current drain and size are limiting greater power. A small improvement in noise figure reduction of the receivers is possible, but the theoretical limit is rapidly being reached.

Diversity techniques utilizing the parameters of frequency, time, space, angle, and polarization in the communications resource are also capable of improving the communications quality of the signal to overcome the limitations described above. However, these improvements do not come without cost. For example, space-, angle-, and polarization-diversity require additional hardware at the receiver. At a minimum, a second antenna and coaxial line—representing an undesirable cost increase—are required. In addition, a second receiver and/or switch may be required, thereby increasing costs and adding other technical limitations. As for time- and frequency-diversity schemes, the associated cost is usually measured in terms of reduced spectral efficiency. That is, by employing a time- and/or frequency-diversity scheme at all times, even when the signal quality is acceptable, the resulting spectral inefficiency may be prohibitive.

Accordingly, there exists a need for a radio communication system that provides improved signal quality, without suffering from the aforementioned shortcomings of the prior art. In particular, a system that provided improved signal quality, without additional hardware costs or unacceptable reductions in bandwidth efficiency, would be an improvement over the prior art.

DETAILED DESCRIPTION OF THE PREFERRED EMBODIMENT

The present invention encompasses a method of exchanging a signal between two or more communication devices. The method employs a communications resource for diverse transmission of the signal, if and when the quality of the signal becomes unfavorable. In this manner, the present invention operates to efficiently use the communications resource by providing a quality-based determination of when signal diversity is required.

Figure 1:
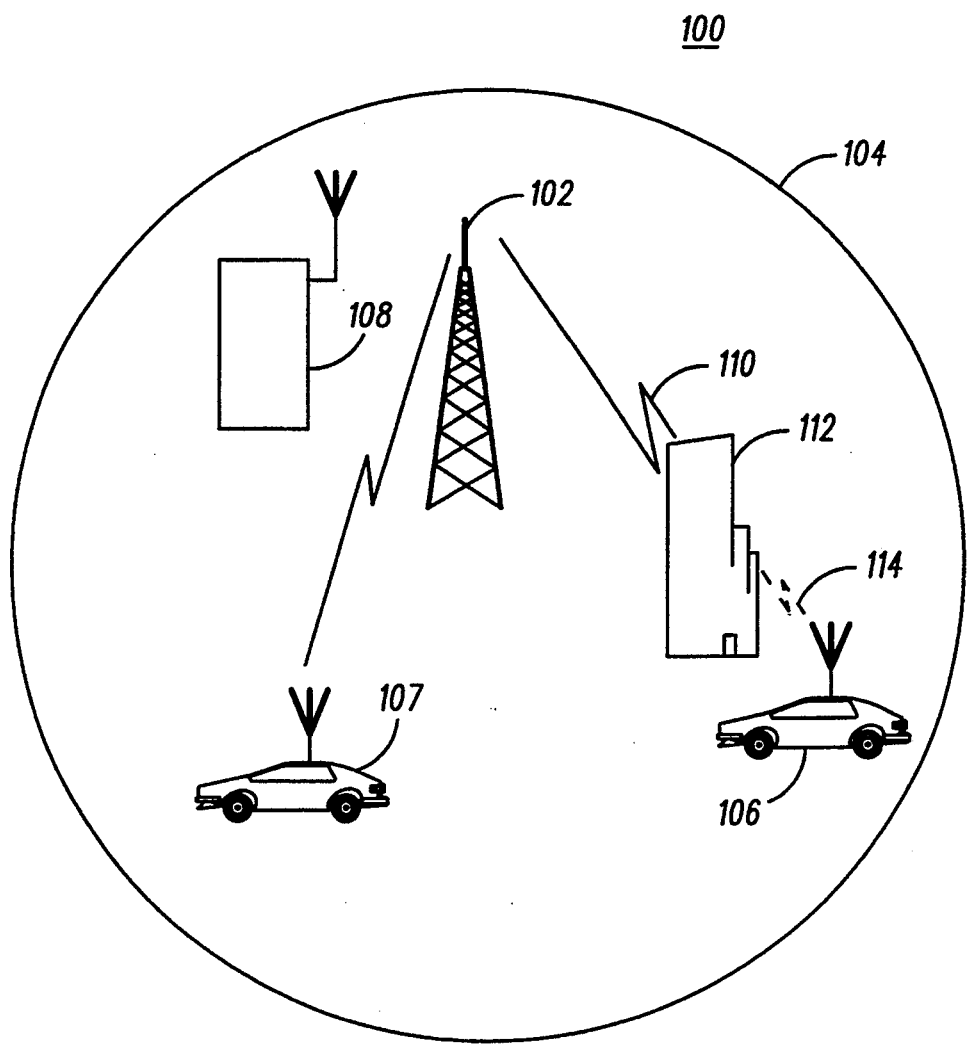
FIG. 1 shows a radio communication system, where the present invention might be advantageously employed.

FIG. 1 generally depicts a radio communication system 100, including a repeater 102 that services a coverage area 104. Communication units 106–108—e.g. mobile radios, portable radios—roam about the coverage area 104 and employ repeater 102 to establish communication with each other. Communication is established between the communication units (106–108) via a communications resource 110—e.g., time division multiple access (TDMA) time slots, radio frequency (RF) channels, or any other suitable resource. The signal being transmitted on communications resource 110 may become compromised, for example, when obstructed by a building 112. Such obstructions, or any other interference source, typically cause the quality of the communications resource 110 to be compromised, as indicated by the compromised communications resource 114.

As mentioned earlier, the known ways of overcoming this compromised condition have practical limitations. For example, increasing the power transmitted by the repeater 102 to overcome the level of noise at the receiver using the compromised communications resource 114 beyond certain limits is prohibited by the FCC. Likewise, conventional diversity combining employed at the plurality of communication units (106–108) requires the addition of costly antennas and other so-called "frontend" hardware necessary to implement such a solution. Lastly, the problem of inefficiency is illustrated in FIG. 1, since all of the communication units do not require additional capability all of the time. In particular, only unit 106 is using the compromised communications resource 114, so a preferred embodiment of the present invention is to employ combinations of known diversity schemes, only at times that they are required to improve the signal quality to an acceptable level—e.g., on the compromised communications resource 114.

Figure 2:
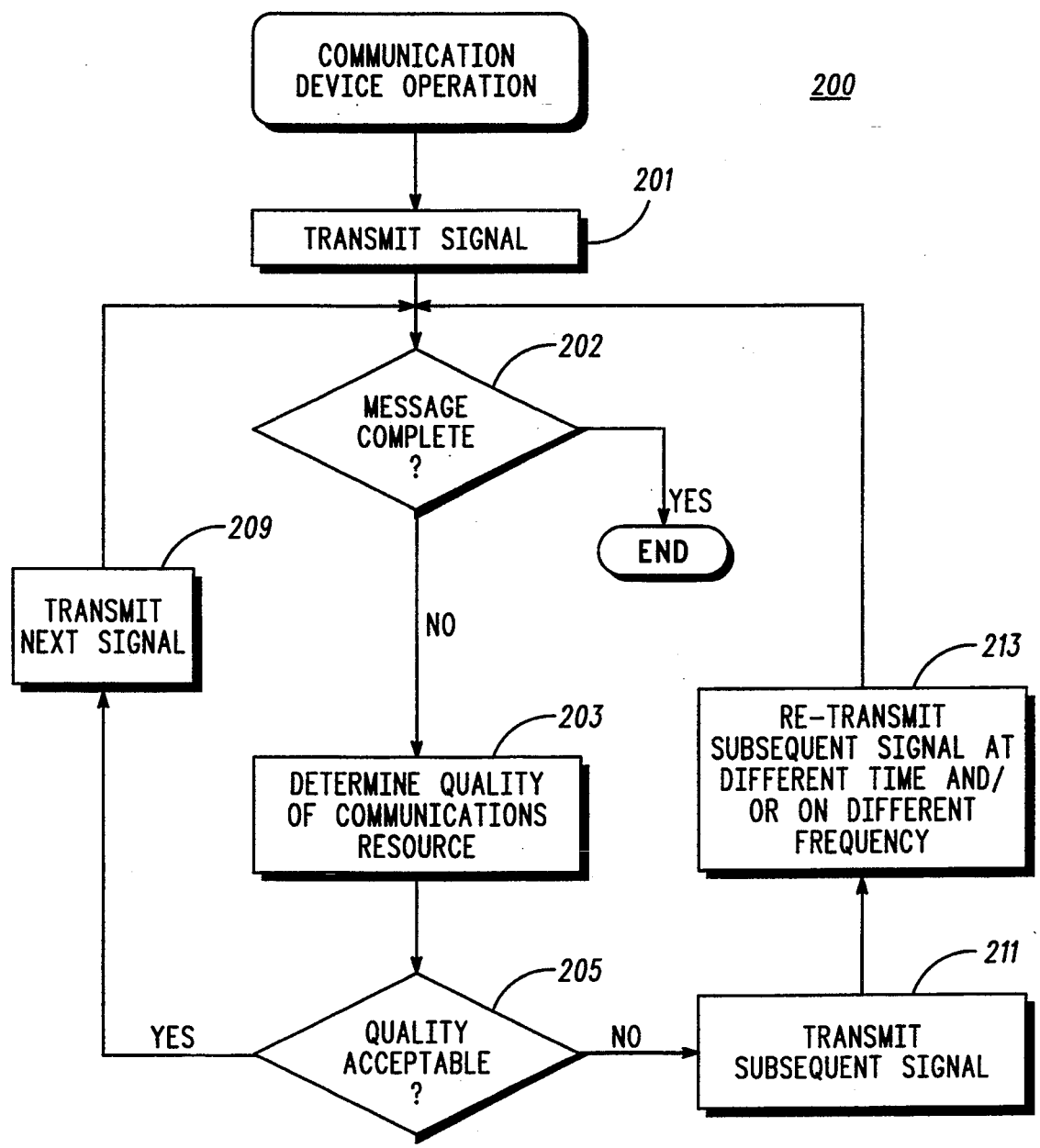
FIG. 2 shows a flow diagram depicting the operation of the communication device, in accordance with the present invention.

FIG. 2 shows a flow diagram 200 depicting the operation of a communication device in accordance with the present invention. It should be noted that the communication device capable of employing the present invention may be at the fixed end—e.g., repeater 102—or the mobile end—e.g., communication unit 106. The signal of interest is first transmitted (201) to a target communication device. This signal can be trunked frequency division multiple access (FDMA) channels of AM, FM, SSB, data including but not limited to forms of QAM and QPSK, as well as time division multiple access (TDMA) using all of these types of modulation. A decision (202) is then reached to determine whether or not the message is complete. If so, the routine is exited.

If more transmissions are required to complete the message, the quality of the communications resource—i.e., the signal being transmitted thereon—is determined (203). There are several techniques available to accomplish this function. A measurement of the received signal strength is the most basic check and applies to analog or data systems. Similarly, the determination can be a simple measurement of the signal-to-noise ratio (SNR), signal-to-interference ratio (SIR), or the signal-to-noise plus interference ratio (SNPIR). In data systems, the bit error rate (BER) is a well known check of the resource—of course, this technique is limited to known symbols—e.g., pilots—being sent, or to a system having a forward error correcting (FEC) code to determine the number of errors. In a preferred embodiment of the present invention, a TDMA signal is transmitted, and the BER is used to determine the quality of the communications resource and the signal transmitted thereon.

After a determination of the quality level is made, a decision (205) is reached to determine whether or not this level is above a predetermined quality threshold. Threshold levels can be varied, depending, for example, on the priority of the message, or on the technology being used. In a preferred embodiment, a TDMA system is used with data being transmitted using 4-ary 16-QAM modulation, and a BER threshold set at four percent. Hysteresis is preferably used to keep the receiver from toggling between acceptable and non-acceptable on adjacent transmissions. That is, in a preferred embodiment, the next signal must be over 3 percent BER to declare the communications resource acceptable without augmentation.

When the quality of the communications resource is acceptable, the next signal—e.g., data word—is transmitted (209) and the message is again checked (202) for completeness. It should be noted that a message is typically made up of a plurality of sequential signals, and at the end of a message, an end of message (EOM) signal is transmitted. If an EOM is detected, the routine is exited. If an EOM is not detected, the next signal in the plurality of sequential signals is transmitted.

Referring again to decision 205, if the quality is found to be unacceptable, a subsequent signal is transmitted (211). [It should be noted that this subsequent signal is not the signal that was used to determine the quality of the communications resource. Rather, it is the next signal in the sequence of the plurality of signals that make up a multi-signal message.] The subsequent signal is then re-transmitted (213) on another portion—e.g., channel—of the communications resource. In a preferred embodiment, this channel can take the form of a different slot on the same frequency, a different slot on a different frequency, or the same slot on a different frequency. This re-transmission might take place one or more times within the same portion of the communications resource, as later described.

Figure 3:
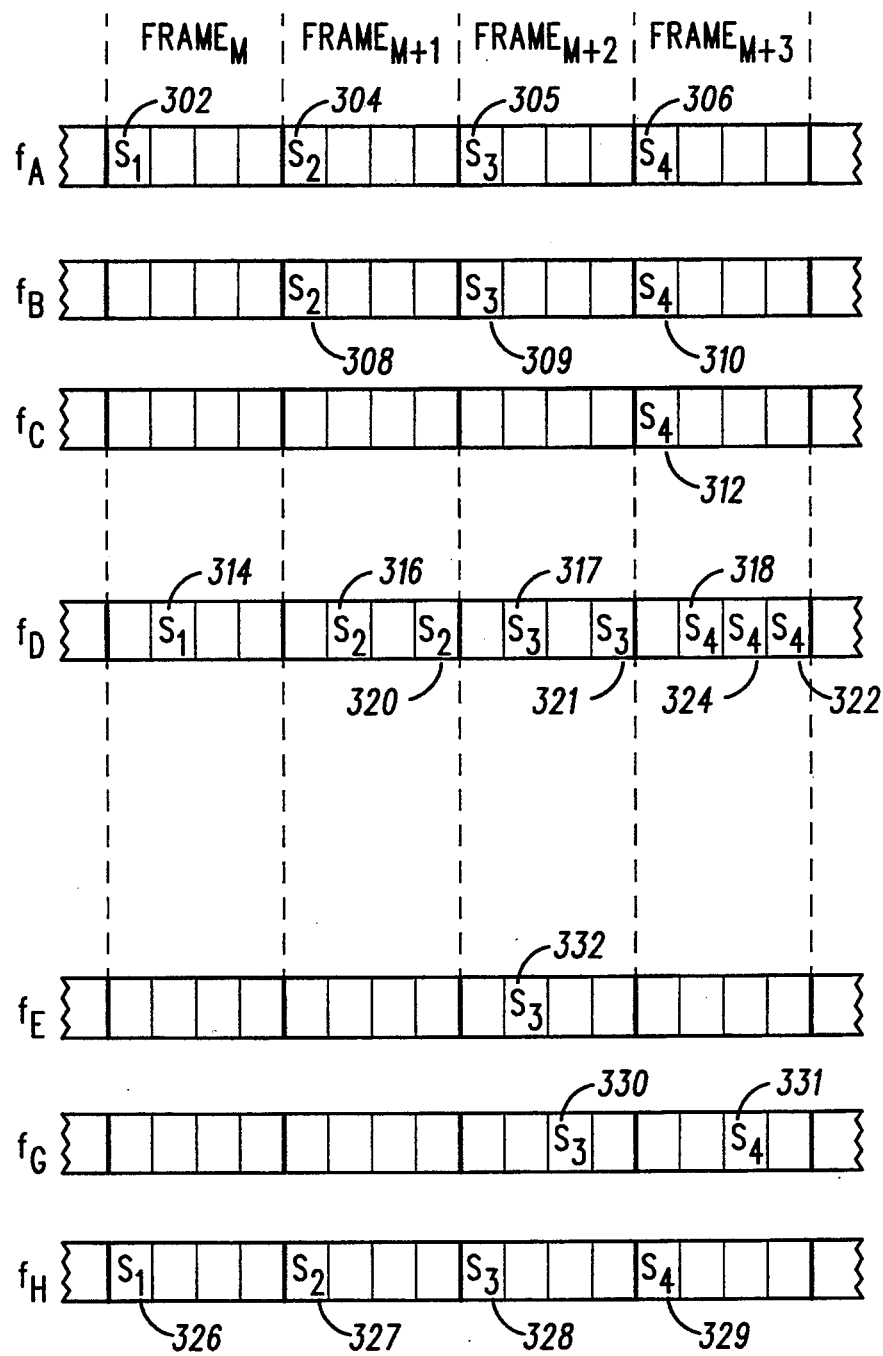
FIG. 3 shows a graphical representation of a communication resource and signaling sequences transmitted thereon, in accordance with several embodiments of the present invention.

The present invention can be exemplified using a series of examples, and with reference to FIG. 3. FIG. 3 shows a communications resource 300, in accordance with the present invention, and is made up of H frequencies, each of which being partitioned into time frames denoted by the subscripts m, m+1, m+2, and m+3. For purposes of illustrating three alternate embodiments, portions of three messages will be used to demonstrate the instant invention. A first message is contained on frequencies $f_A$, $f_B$, and $f_C$; a second message is contained only on frequency $f_D$; and a third message is contained on frequencies $f_E$, $f_G$, and $f_H$. [It should be noted that, while the following description discusses three alternate embodiments of the invention, additional embodiments might be realized by employing a combination of these alternates, depending on the system augmentation scheme.]

Referring to the first message, the slot 302 of frame$_m$ carries a signal $S_1$ to be transmitted at frequency $f_A$. [Note that this may be, but need not be, the first signal of the message.] If it is determined that the slot 302, and hence signal $S_1$, does not meet the quality threshold for acceptable communication, the next signal, $S_2$, is transmitted using diversity. In particular, a frequency diversity scheme is enabled such that subsequent signals ($S_2$–$S_4$) are transmitted in the same timeslots (304–306) in subsequent frames (frame$_{m+1}$–frame$_{m+3}$) of $f_A$, and re-transmitted in the same relative timeslots (308–310) of $f_B$. Of course, if the quality again becomes unfavorable—i.e., signal quality of $S_3$ transmitted in timeslots 305, 309 is unacceptable—the diversity scheme can be extended for re-transmission on other frequencies—e.g., timeslot 312, carrying signal $S_4$ on frequency $f_C$. Likewise, the frequency-diversity scheme could be disabled—fully or partially—responsive to an improvement in signal quality beyond the upper threshold level—assuming a hysteresis threshold system, as earlier described—and alternately re-enabled—fully or partially—until the message is complete.

Similarly, referring to the second message, the slot 314 of frame$_m$ carries a signal $S_1$ to be transmitted at frequency $f_D$. [Note, again, that this may be, but need not be, the first signal of the message.] If it is determined that the slot 314, and hence signal $S_1$, does not meet the quality threshold for acceptable communication, the next signal, $S_2$, is transmitted using diversity. In particular, a time-diversity scheme is enabled such that subsequent signals ($S_2$–$S_4$) are transmitted in the same timeslots (316–318) in subsequent frames (frame$_{m+1}$—frame$_{m+3}$) of $f_D$, and re-transmitted in different relative timeslots (320–322) of $f_D$. Of course, if the quality again becomes unfavorable—i.e., signal quality of $S_3$ transmitted in timeslots 317, 321 is unacceptable—the diversity scheme can be extended for re-transmission in other timeslots—e.g., timeslot 324, carrying signal $S_4$ on frequency $f_D$. Likewise, the time-diversity scheme could be disabled—fully or partially—responsive to an improvement in signal quality beyond the upper threshold level, and alternately re-enabled—fully or partially—until the message is complete.

Lastly, referring to the third message, the slot 326 of frame$_m$ carries a signal $S_1$ to be transmitted at frequency $f_H$. [Again, this may be, but need not be, the first signal of the message.] Assuming that the quality is acceptable, signal $S_2$ is transmitted in the same relative timeslot (327) of frame$_{m+1}$. If it is then determined that the slot 327, and hence signal $S_2$, does not meet the quality threshold for acceptable communication, the next signal, $S_3$, is transmitted using diversity. In particular, a frequency- and time-diversity scheme is enabled such that subsequent signals ($S_3$, $S_4$) are transmitted in the same timeslots (328,329) in subsequent frames (frame$_{m+2}$, frame$_{m+3}$) of $f_H$, and re-transmitted in a different relative timeslot (330, 331) of $f_G$, as well as yet a different relative timeslot (332) of $f_E$. Of course, like the other diversity schemes, if the quality becomes favorable—e.g., signal quality of $S_3$ transmitted in timeslots 330, 332 is beyond a particular threshold—the diversity scheme can be partially disabled—i.e., reduced to a two-frequency only scheme for signal $S_4$ as shown in frame$_{m+3}$. Of course, the time-, and frequency-diversity scheme could also be fully disabled responsive to a substantial improvement in signal quality, and alternately re-enabled—fully or partially—until the message is complete.

What is claimed is:

1. In a radio communications system, a method for exchanging a message between a plurality of communication devices using a communications resource, the method comprising the steps of:
   A) transmitting, from a first of the plurality of communication devices a first portion of the message on a first frequency within the communications resource;
   B) determining the quality of the communications resource; and
   C) when the quality of the communications resource is unfavorable, transmitting a second portion of the message on the first frequency and on a second frequency.

2. The method of claim 1, wherein step B) comprises the step of:
   at the first communication device;
   B1) calculating a signal quality metric for a signal sent from a second communication device; and
   B2) transmitting the signal quality metric to the second communication device.

3. The method of claim 1, further comprising the step of:
   D) identifying a time when the signal-to-noise ratio (SNR) of the first portion of the message falls below a predetermined threshold as being when the quality of the communications resource is unfavorable.

4. The method of claim 1, further comprising the step of:
   D) identifying a time when the bit error rate (BER) for the first portion of the message falls below a predetermined threshold as being when the quality of the communications resource is unfavorable.

5. The method of claim 1, further comprising the step of:
   D) transmitting, in response to the step of determining, the second portion of the message on a third frequency.

6. In a radio communications system, a method for exchanging a message between a plurality of communication devices using a communications resource, the method comprising the steps of:
   A) transmitting, from a first of the plurality of communication devices, a first portion of the message at a first time on a first frequency within the communications resource;
   B) determining the quality of the communications resource; and
   C) when the quality of the communications resource is unfavorable, transmitting a second portion of the message at a time corresponding to the first time on the first frequency and at a second time on the first frequency.

7. The method of claim 6, wherein step B) comprises the step of:
   at the first communication device;
   B1) calculating a signal quality metric for a signal sent from a second communication device; and
   B2) transmitting the signal quality metric to the second communication device.

8. The method of claim 6, further comprising the step of:
   D) identifying a time when the signal-to-noise ratio (SNR) of the first portion of the message falls below a predetermined threshold as being when the quality of the communications resource is unfavorable.

9. The method of claim 6, further comprising the step of:
   D) identifying a time when the bit error rate (BER) for the first portion of the message falls below a predetermined threshold as being when the quality of the communications resource is unfavorable.

10. The method of claim 6, further comprising the step of:
    D) transmitting, in response to the step of determining, the second portion of the message at a third time on the first frequency.

11. The method of claim 6, wherein the communications resource includes a plurality of time division multiple access (TDMA) frames on the first frequency, and step A) comprises the step of transmitting the second portion of the message in a first timeslot within a first of the plurality of TDMA frames.

12. In a radio communications system, a method for exchanging a message between a plurality of communication devices using a communications resource, the method comprising the steps of:

A) transmitting, from a first of the plurality of communication devices, a first portion of the message at a first time on a first frequency within the communications resource;

B) determining the quality of the communications resource; and

C) when the quality of the communications resource is unfavorable, transmitting a second portion of the message at a time associated with the first time on the first frequency and at a second time on a second frequency within the communications resource.

13. The method of claim 12, wherein step B) comprises the step of:

at the first communication device;

B1) calculating a signal quality metric for a signal sent from a second communication device; and B2) transmitting the signal quality metric to the second communication device.

14. The method of claim 12, further comprising the step of:

D) identifying a time when the signal-to-noise ratio (SNR) of the first portion of the message falls below a predetermined threshold as being when the quality of the communications resource is unfavorable.

15. The method of claim 12, further comprising the step of:

D) identifying a time when the bit error rate (BER) for the first portion of the message falls below a predetermined threshold as being when the quality of the communications resource is unfavorable.

16. The method of claim 12 wherein the communications resource includes a plurality of time division multiple access (TDMA) frames on the first frequency and a plurality of TDMA frames on the second frequency, and step A) comprises the step of:

A1) transmitting the first portion of the message in a first timeslot within a first of the plurality of TDMA frames on the first frequency; and wherein step C) comprises the step of:

C1) transmitting the second portion of the message in the first timeslot and in a second timeslot within a second of the plurality of TDMA frames on the second frequency.

17. A data transmitter for transmitting a message to a communication device using a communications resource, the communications resource including a plurality of time division multiple access (TDMA) frames on a first frequency and a plurality of TDMA frames on a second frequency, the data transmitter comprising:

means for transmitting a first portion of the message in a first timeslot within a first of the plurality of TDMA frames on the first frequency;

means for determining the quality of the first timeslot; and means, operably coupled to the means for determining, for transmitting a second portion of the message in the first timeslot and in a second timeslot within a second of the plurality of TDMA frames on the second frequency.

* * * * *